(12) United States Patent
Nagata et al.

(10) Patent No.: US 9,590,552 B2
(45) Date of Patent: Mar. 7, 2017

(54) MOTOR DRIVE DEVICE AND ELECTRIC COMPRESSOR

(71) Applicant: KABUSHIKI KAISHA TOYOTA JIDOSHOKKI, Kariya-shi, Aichi-ken (JP)

(72) Inventors: Yoshiki Nagata, Aichi-ken (JP); Takuya Naruse, Aichi-ken (JP); Akimitsu Ichihara, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 135 days.

(21) Appl. No.: 14/693,064

(22) Filed: Apr. 22, 2015

(65) Prior Publication Data

US 2015/0311845 A1    Oct. 29, 2015

(30) Foreign Application Priority Data

Apr. 23, 2014  (JP) ................. 2014-088998

(51) Int. Cl.
*H02P 21/00* (2016.01)
*H02P 6/04* (2016.01)
*H02P 6/18* (2016.01)

(52) U.S. Cl.
CPC .......... *H02P 21/0053* (2013.01); *H02P 6/185* (2013.01); *H02P 21/0021* (2013.01); *H02P 21/26* (2016.02); *H02P 21/34* (2016.02); *H02P 21/20* (2016.02)

(58) Field of Classification Search
CPC .. H02P 21/0053; H02P 6/185; H02P 21/0021; H02P 6/21; H02P 21/34; H02P 6/20
USPC ......... 318/400.02, 400.11, 400.32, 721, 432, 318/439, 138, 254, 433, 700, 720, 722, 318/724
See application file for complete search history.

(56) References Cited

U.S. PATENT DOCUMENTS

2009/0195198 A1* 8/2009 Lee .................. H02P 6/185
318/400.11

FOREIGN PATENT DOCUMENTS

JP    2004-072906 A    3/2004

* cited by examiner

*Primary Examiner* — Bentsu Ro
*Assistant Examiner* — Zemenay Truneh
(74) *Attorney, Agent, or Firm* — Sughrue Mion, PLLC

(57) ABSTRACT

A motor drive device drives a multi-phase synchronous motor in an electric compressor. The multi-phase synchronous motor includes a rotor that is provided with a permanent magnet and a stator having coils of different phases. The motor drive device includes an inverter that supplies current to the coils and a control unit that controls the inverter. The control unit executes an initial angular position calculation processing of detecting a d-axis and a q-axis as an initial angular position of the rotor, a rotating processing of rotating the d-axis and the q-axis in a direction opposite to rotation of the rotor, an acceleration processing of accelerating the rotation of the rotor, and a sensorless control processing of controlling the rotation of the rotor.

4 Claims, 6 Drawing Sheets

FIG. 4

| PROCESSING | ANGLE FORMED BY ROTOR AND CONTROL AXIS | CURRENT CONTROL | ACTUAL CURRENT | GENERATED TORQUE |
|---|---|---|---|---|
| PROCESSING P2 (AFTER INITIAL ANGULAR POSITION DETECTION) | $\approx 0$ | NOT EXECUTED | $Iq = 0$<br>$Id = 0$ | $Tm = p\{\Phi a Iq + (Ld - Lq) IdIq\}$<br>p: NUMBER OF PAIRS OF MAGNETIC POLES<br>$\Phi a$: INTERLINKED MAGNETIC FLUX<br>Ld: d-AXIS INDUCTANCE<br>Lq: q-AXIS INDUCTANCE |
| PROCESSING P2 -> P3 (INITIAL ENERGIZATION AFTER SHIFTING AXES) | $-\theta a$ | $Iq' = Iqref\_m$<br>$Id' = Idref\_m$ | $Iq = 0$<br>$Id = \sqrt{(Iqref\_m^2 + Idref\_m^2)}$ | |
| PROCESSING P3 (INITIAL ACCELERATION) | $-\theta a + \Delta\theta$ | $Iq' = Iqref\_m$<br>$Id' = Idref\_m$ | $Iq = \sqrt{(Iqref\_m^2 + Idref\_m^2)} \sin \Delta\theta$<br>$Id = \sqrt{(Iqref\_m^2 + Idref\_m^2)} \cos \Delta\theta$ | |
| PROCESSING P3 -> P4 (IMMEDIATELY AFTER SWITCHING TO SENSORLESS CONTROL) | CONVERGED TO $\approx 0$ | $Iq' = Iqref\_m$<br>$Id' = Idref\_m$ | $Iq \approx Iqref\_m$<br>$Id \approx Idref\_m$ | |
| PROCESSING P4 (SENSORLESS CONTROL) | CONVERGED TO $\approx 0$ | $Iq' = Iqref$<br>$Id' = Idref$<br>TO BE DETERMINED BY FEEDBACK CONTROL. | $Iq = Iqref$<br>$Id = Idref$<br>TO BE DETERMINED BY FEEDBACK CONTROL. | |

BEFORE START (t = t0)

INITIAL ANGULAR POSITION DETECTION
(t = t0 TO t1)
(PULSE APPLICATION, CALCULATION)

SHIFT THE CONTROL AXES
BY θa
(INITIAL ACCELERATION - 1)
(t = t1)

ROTATE THE
CONTROL AXES (-θa)

ROTATING
DIRECTION OF
ROTOR

START OF ENERGIZATION AND
ACCELERATION
(INITIAL ACCELERATION – 2)
(t = t1 TO t2)

TRANSITION TO SENSORLESS CONTROL
WHILE MAINTAINING CURRENT
CONTROL AFTER THE PREDETERMINED
SPEED IS REACHED
(t = t2 TO t3)

MOTOR DRIVE DEVICE AND ELECTRIC COMPRESSOR

BACKGROUND OF THE INVENTION

The present invention relates to a motor drive device and an electric compressor and, more particularly to a motor drive device wherein a permanent magnet is provided in a rotor and an electric compressor having the motor drive device.

A motor in which a permanent magnet is provided in a rotor of the motor has been widely used in, for example, an air conditioner or an electric vehicle. In an inverter device that drives a motor, the so-called vector control is employed in which the current is divided into a magnetic flux component current (or a d-axis current) and a torque component current (or a q-axis current) that is orthogonal to the magnetic flux component current and the two component currents are controlled individually. In the vector control, a coordinate system of three phases u, v and w is converted into a coordinate system of d- and q-axes. The angular position of the rotor needs to be known for the coordinate conversion. Generally, the angular position of the rotor is detectable by an angular position sensor, such as a resolver and a rotary encoder.

For the reduction of the size and cost of the motor, it is preferable that a motor should be controlled without the use of such angular position sensor. Therefore, vector sensorless control has been used in which a motor is controlled by the induced voltage that is calculated based on a d-axis current and a q-axis current.

Japanese Unexamined Patent Application Publication No. 2004-72906 discloses a control scheme performed at a start of a permanent magnet motor in which the vector sensorless control is executed.

In the technique disclosed in the above-identified Publication, a current is flowed through coils of a stator to attract a rotor of the motor when the angular position of the rotor before the motor is started is unknown (angular position determination phase). By so doing, the direction of the magnetic flux formed by the permanent magnet and the direction of the magnetic flux formed by an armature current almost coincide with each other.

Subsequently, the command value for rotational speed is incremented form zero (forcible rotation phase). As a result, the direction of the magnetic flux formed by the armature current is rotated so that a difference in phase is created between the direction of the magnetic flux formed by the armature current and the direction of the magnetic flux formed by the permanent magnet. This difference in phase generates a rotational torque and the rotor starts to rotate accordingly.

When the rotational speed of the rotor has reached a predetermined value, a processing for current switching between a current Id and a current Iq is executed (current switching phase). When the current switching processing ends, the rotation of the rotor is controlled using an estimated angular velocity value (steady operation phase).

In the above technique, however, a large amount of power is consumed in the angular position determination phase, and there exists an initial angular position of the rotor which hinders the determination of the angular position thereof. Examples of such initial angular position include the angular position of the rotor that is located 180 degrees shifted or rotated from the motor current at the initial angular position determination phase. Furthermore, the current switching processing while the rotor is rotating is difficult to execute and, therefore, a high operational load is imposed on the controller.

The present invention, therefore, is directed to providing a motor drive device which consumes less power at a start of a motor and imposes less operational load, and to providing an electric motor.

SUMMARY OF THE INVENTION

In accordance with the present invention, there is provided a motor drive device that drives a multi-phase synchronous motor in an electric compressor. The multi-phase synchronous motor includes a rotor having a permanent magnet and a stator having coils of different phases. The motor drive device includes an inverter that supplies current to the coils and a control unit that controls the inverter. The control unit executes an initial angular position calculation processing, a rotating processing, an acceleration processing, and a sensorless control processing. The initial angular position calculation processing includes detecting a d-axis and a q-axis as an initial angular position of the rotor based on a current flowing in response to a voltage pulse applied to the coils of the stator. The rotating processing includes rotating the d-axis and the q-axis of the rotor by a predetermined angle θa in a direction opposite to rotation of the rotor. The accelerating processing includes accelerating the rotation of the rotor by rotating the rotated d-axis and the rotated q-axis in the rotating direction of the rotor and flowing through the stator the torque component current determined based on a d-axis and a q-axis. The sensorless control processing includes controlling the rotation of the rotor based on an angular position and a speed of the rotor that are estimated based on the voltage applied to or the current flowing through the coils of different phase after an angular velocity of the rotor has reached a predetermined speed by executing the acceleration processing. The predetermined angle θa is determined based on an initial target of a d-axis and an initial target of a d-axis of the sensorless control processing.

Other aspects and advantages of the invention will become apparent from the following description, taken in conjunction with the accompanying drawings, illustrating by way of example the principles of the invention.

BRIEF DESCRIPTION OF THE DRAWINGS

FIG. 4 is a table explaining relationships between each of processings P2 to P4 and command values for controlling current;

FIG. 7 is a view showing an initial state of acceleration subsequent to the motor being energized after the control axis is shifted angularly by −θa;

DETAILED DESCRIPTION OF THE EMBODIMENTS

Figure 1:
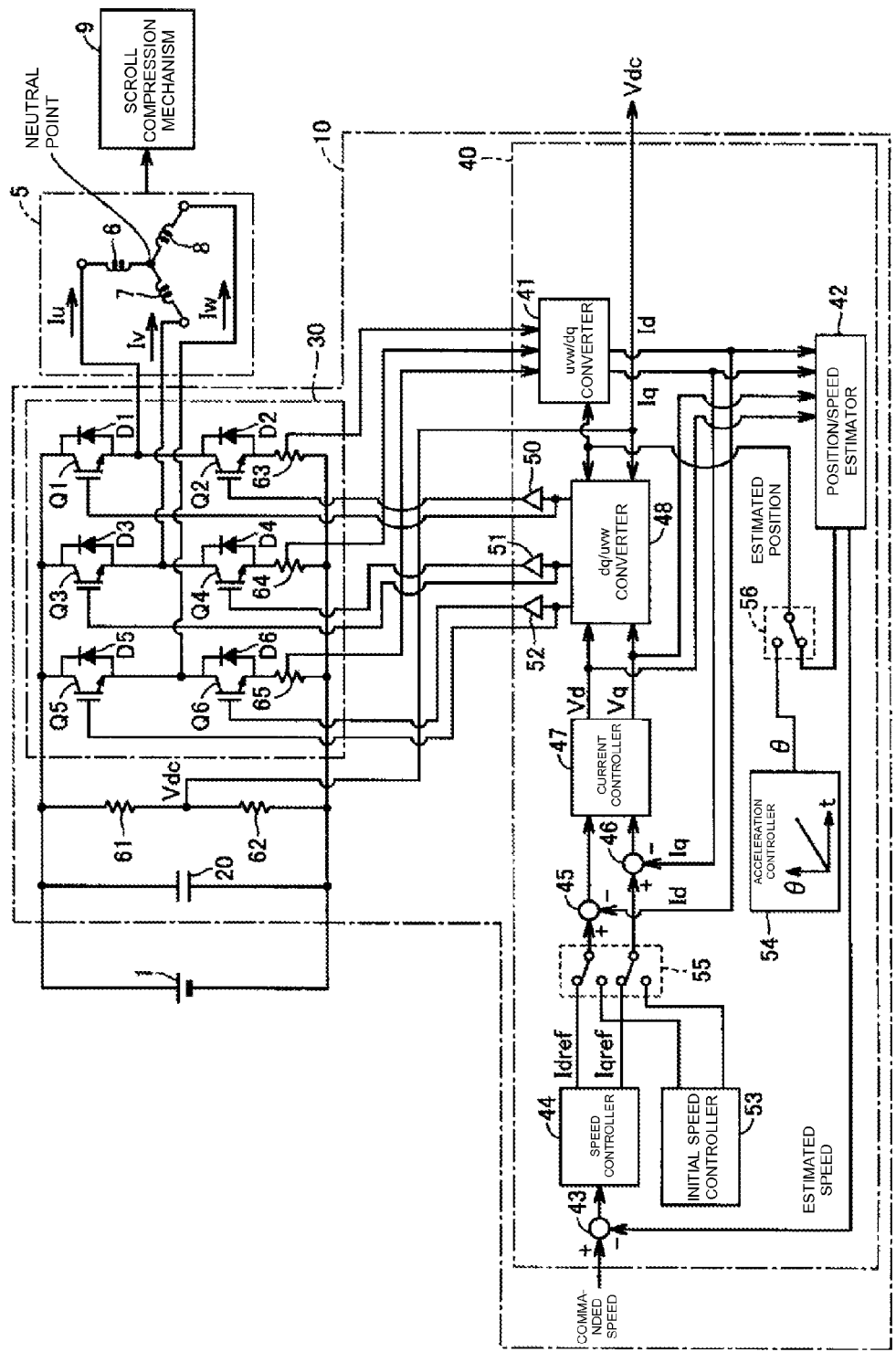
FIG. 1 is a circuit diagram showing a configuration of an electric compressor according an embodiment of the present invention.

The following will describe the embodiment of the present invention with reference to the drawings. In the drawings, like numerals refer to like parts and the description for such parts will not be reiterated.

FIG. 1 is a circuit diagram showing a configuration of the electric compressor according to the present embodiment. Referring to FIG. 1, the electric compressor includes an AC motor 5, an inverter device 10, and a scroll compressing mechanism 9 that is driven by the AC motor 5.

The inverter device 10 receives power from a high-voltage battery 1 as a DC power source to drive and control the AC motor 5. The AC motor 5 is a three-phase synchronous motor and is used, for example, as a motor for an air conditioner in a vehicle (a motor for air conditioner compressor).

The inverter device 10 includes a capacitor 20, a switching circuit 30, and a motor control unit 40.

The high-voltage battery 1 is connected at the positive terminal thereof to one terminal of the capacitor 20 and the positive line of the switching circuit 30. The high-voltage battery 1 is connected at the negative terminal thereof to the other terminal of the capacitor 20 and the negative line of the switching circuit 30. DC power is supplied from the high-voltage battery 1 to the switching circuit 30 through the capacitor 20. Although not shown specifically in the drawing, the high-voltage battery 1 may be a power source that supplies power to a traction motor of an electric vehicle or a hybrid vehicle.

The switching circuit 30 includes switching elements Q1 to Q6, diodes D1 to D6, and shunt resistors 63 to 65. Insulated gate bipolar transistors (IGBTs) may be used for the switching elements Q1 to Q6. The switching elements Q1 and Q2 for U-phase and the shunt resistor 63 are serially connected between the positive line and the negative line of the switching circuit 30. The switching elements Q3 and Q4 for V-phase and the shunt resistor 64 are serially connected between the positive line and the negative line of the switching circuit 30. The switching elements Q5 and Q6 for W-phase and the shunt resistor 65 are serially connected between the positive line and the negative line of the switching circuit 30. The switching elements Q1 to Q6 are inversely connected in parallel to the diodes D1 to D5, respectively. The coils 6, 7 and 8 of different phases of the AC motor 5 are connected to the node between the switching elements Q1 and Q2, the node between the switching elements Q3 and Q4, and the node between the switching elements Q5 and Q6, respectively in the Y-connection.

The resistors 61 and 62 are serially connected between the positive and negative lines of the switching circuit 30 on the power input side thereof. An input voltage is detectable from a voltage Vdc at the node between the resistors 61 and 62. A current flowing through the DC motor 5 is detectable from voltages at the shunt resistors 63 to 65.

The motor control unit 40 controls the AC motor 5 according to the vector control method. The motor control unit 40 includes a uvw/dq converter 41, a position/speed estimator 42, a subtractor 43, a speed controller 44, subtractors 45 and 46, a current controller 47, and a dq/uvw converter 48.

The subtractor 43 of the motor control unit 40 receives a motor speed command indicative of a speed of the AC motor 5 from an external device (not shown). The motor control unit 40 drives the switching circuit 30 in response to the commanded motor speed with the vector control.

The dq/uvw converter 48 outputs a U-phase control signal, a W-phase control signal, and a V-phase control signal. The gate terminal of the switching element Q1 receives the U-phase control signal from the dq/uvw converter 48. The gate terminal of the switching element Q2 receives an inverted signal of the U-phase control signal from the inverter 50.

The gate terminal of the switching element Q3 receives the V-phase control signal from the dq/uvw converter 48. The gate terminal of the switching element Q4 receives an inverted signal of the V-phase control signal from an inverter 51.

The gate terminal of the switching element Q5 receives the W-phase control signal from the dq/uvw converter 48. The gate terminal of the switching element Q6 receives an inverted signal of the W-phase control signal from an inverter 52.

Based on the value of current detected at resistors 63 to 65, the uvw/dq converter 41 calculates an excitation component current Id and a torque component current Iq that are converted into d- and q-axes coordinates, respectively, on the axis of the rotor of the AC motor 5. The excitation component current Id and the torque component current Iq thus calculated are input to the position/speed estimator 42. The calculated excitation component current Id is also input to the subtractor 45 and the calculated torque component current Iq is also input to the subtractor 46, respectively.

The position/speed estimator 42 calculates an estimated rotor speed of the AC motor 5 based on the excitation component current Id, the torque component current Iq, an excitation component voltage Vd, and a torque component voltage Vq. The calculated estimated rotor speed is input to the subtractor 43. The calculated estimated rotor speed is supplied to the uvw/dq converter 41 and the dq/uvw converter 48 through a switching device 56.

The subtractor 43 subtracts the estimated rotor speed from the commanded speed. The speed controller 44 receives from the subtractor 43 a signal indicative of the difference between the commanded speed and the estimated speed, based on which the speed controller 44 calculates a target value Idref for the excitation component current Id and a target value Iqref for the torque component current Iq, respectively. The target value Idref for the excitation component current Id is input to the subtractor 45 through the switching device 55. The target value Iqref for the torque component current is input to the subtractor 46 through the switching device 55.

The subtractor 45 subtracts the excitation component current Id from the target value Idref and the result of the subtraction is input to the current controller 47. The stubtractor 46 subtracts the torque component current Iq from the target value Iqref. The result of the subtraction is input to the current controller 47.

The current controller 47 calculates the excitation component voltage Vd converted into the d-axis coordinate on the rotor axis of the AC motor 5 based on a difference between the target value Idref and the excitation component current Id. The excitation component voltage Vd is input to the dq/uvw converter 48 and the position/speed estimator 42. The current controller 47 calculates the torque component voltage Vq converted into the q-axis coordinate on the rotor axis of the AC motor 5 based on a difference between the target value Iqref and the torque component current Iq. The torque component voltage Vq is input to the dq/uvw converter 48 and the position/speed estimator 42.

The voltage Vdc, which is a voltage divided by the resistors 61 and 62, is input to the dq/uvw converter 48. The dq/uvw converter 48 then calculates drive voltages Vu, Vv, and Vw for the coils 6, 7, and 8 of different phases of the AC motor 5 based on the estimated rotor angular position, the excitation component voltage Vd, the torque component voltage Vq, and the voltage Vdc that are to be input, and generates a drive waveform signal (a PWM signal) that is necessary for gaining the drive voltages Vu, Vv, and Vw. Using the drive waveform signal, each of the switching elements Q1 to Q6 of the switching circuit 30 is switched between ON and OFF.

Thus, in the present embodiment, the motor control unit 40 controls the switching elements Q1 to Q6 provided in the current path of the AC motor 5 by the PWM control so that the excitation component current Id and the torque component current Iq of the AC motor 5 that are calculated based on the current detected at the shunt resistors 63 to 65 become the target value, respectively.

The motor control unit 40 executes a control procedure for initial drive operation of the AC motor 5 until the speed of the rotor has reached a predetermined level, and executes a control procedure for sensorless operation of the AC motor 5 after the speed of the rotor has reached the predetermined speed. In the sensorless operation, the motor is rotated based on estimated values of the rotor angular position and the rotor speed that are estimated using data such as motor current, without the use of a rotation speed sensor, such as a resolver for detecting angular position of the rotor of the motor. For the control for the sensorless motor operation, a closed-loop speed control that utilizes the position/speed estimator 42 and the speed controller 44 is executed.

The following will describe the control of the initial drive operation of the AC motor 5 more in detail.

The motor control unit 40 includes an initial speed controller 53 that outputs a command indicative of a current for the initial drive operation of the AC motor 5, a switching device 55 that switches between the output of the initial speed controller 53 and the output of the speed controller 44 and transmits such outputs to the subtractors 45 and 46, an acceleration controller 54 that controls the acceleration during the initial drive operation of the AC motor 5, and a switching device 56 that switches between the output of the acceleration controller 54 and the output of the position/speed estimator 42 and transmits such outputs to the uvw/dq converter 41 and the dq/uvw converter 48.

In the initial drive operation of the AC motor 5, an open-loop speed control that utilizes the initial speed controller 53 and the acceleration controller 54 is executed, instead of the closed-loop speed control that utilizes the position/speed estimator 42 and the speed controller 44. When the rotor speed has reached a predetermined speed, the switching sections 55 and 56 switch so that the closed-loop speed control that utilizes the position/speed estimator 42 and the speed controller 44 (the sensorless control) is executed.

With the configuration above, the switching elements Q1 to Q6 of the switching circuit 30 are controlled according to the commanded speed, direct current is converted into a three-phase alternative current. The three-phase alternative current is supplied to each of the coils 6, 7, and 8 of different phases of the AC motor 5 for an air conditioner and the AC motor 5 is driven, accordingly.

Referring to FIG. 1, the switching circuit 30 is connected to the high-voltage battery 1 (the DC power source). Alternatively, an AC power source may be used so that AC voltage of the AC power source is converted into DC voltage and the converted DC voltage is supplied to the switching circuit 30.

The shunt resistors 63 to 65 are used for detecting the current. However, hall elements may alternatively be provided between switching circuit 30 and the AC motor 5 for detecting the three-phase alternative current.

Figure 2:
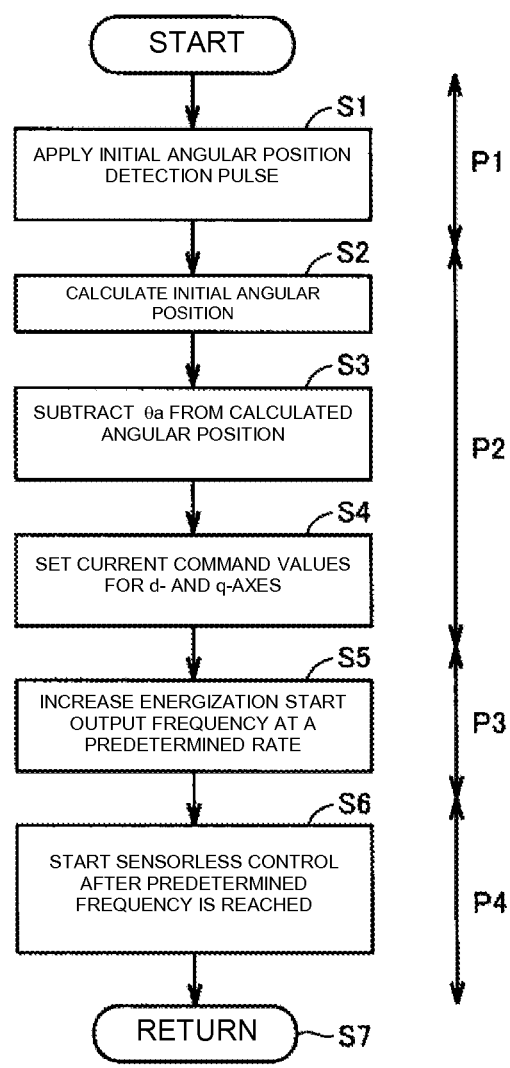
FIG. 2 is a flow chart explaining a control procedure executed by a motor control unit 40 at an initial drive operation of a motor.
Figure 3:
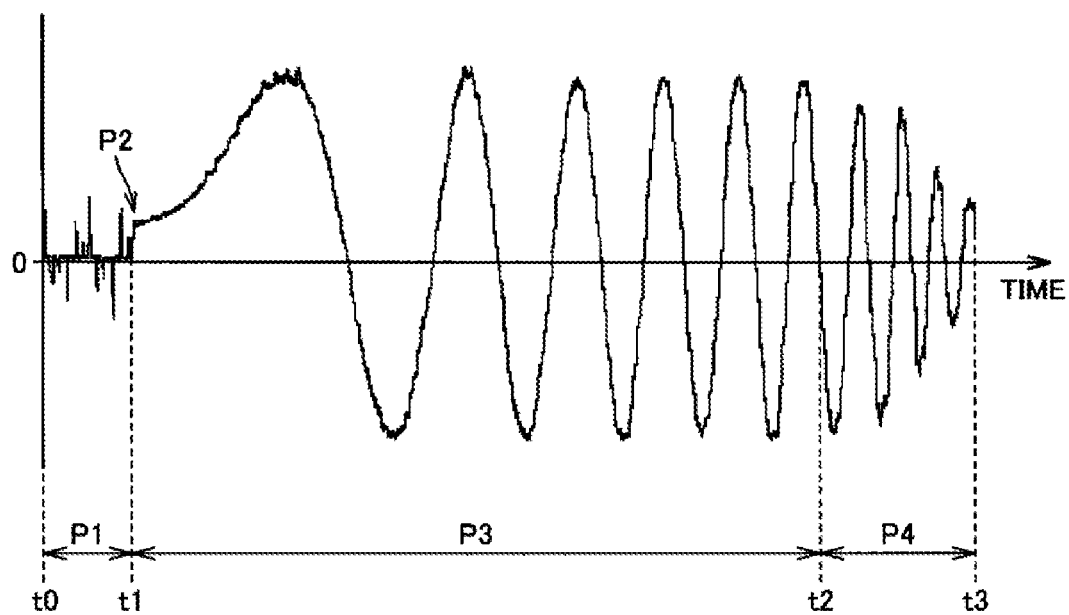
FIG. 3 shows a waveform of a current of one phase at the initial drive operation of the motor.

FIG. 2 shows a flow chart explaining a control procedure that is executed by the motor control unit 40 at the initial drive operation of the AC motor 5. FIG. 3 shows a waveform of a current of one phase at the initial drive operation of the AC motor 5. Referring to FIGS. 1 to 3, when the AC motor 5 and hence the rotor thereof is at a stop, the motor control unit 40 causes the inverter device 10 to apply an initial angular position detection voltage pulse at Step 1 (S1). In processing P1 that is executed between times t0 and t1, current is output in response to the voltage pulse. The current is converted to a voltage at the shunt resistors 63 to 65 and the voltage is detected by the motor control unit 40.

It is to be noted that the initial angular position detection voltage pulse is extremely small as compared with the voltage for driving the AC motor 5 and therefore the rotor remains at a stop due to its own weight and the rotational friction of the rotor. That is, the rotor is at a stop at the time of the initial angular position detection and, therefore, no noise is generated.

The current detected in each phase varies depending on the initial angular position of the rotor. The motor control unit 40 storing therein data on the relationship between the initial angular position of the rotor and the response pattern of current, calculates the initial angular position of the rotor that corresponds to the response pattern of the current (S2 in FIG. 2 and P2 in FIG. 3).

FIG. 4 is a table explaining the relationships between each of processings P2 to P4 and the command values for controlling current. Referring to FIGS. 3 and 4, at the time t1 after the initial angular position detection shown in FIG. 3, the angle formed by the rotor and a control axis (d'-axis) is almost zero degrees, so that no current control is executed, and the actual currents Id and Iq that are flowing through the stator coil are both zero, as shown in FIG. 4.

Figure 5:
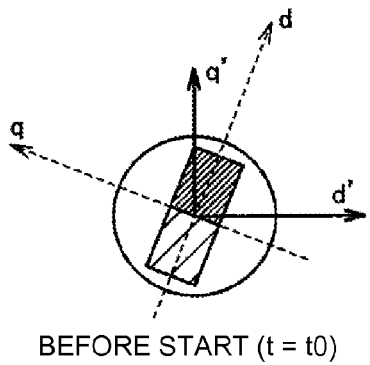
FIG. 5 is a schematic view showing a state of the d'-axis and q'-axis for control before starting of the motor.
Figure 6:
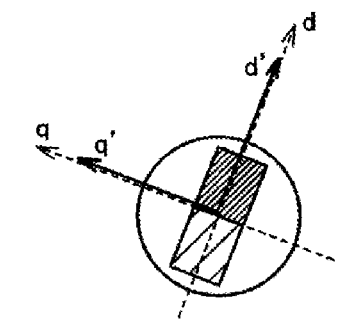
FIG. 6 is a view showing a state of the d'-axis and the q'-axis for control after an initial angular position of the rotor is detected.

FIG. 5 shows the d'-axis and the q'-axis for control before starting the AC motor 5. FIG. 6 shows the d'-axis and the q'-axis for control after the initial angular position detection.

FIG. 5 shows the relationship between the position of the rotor and the d-axis and the q-axis determined by the magnetic pole of the rotor on one hand and between the position of the rotor and the d'-axis and the q'-axis for control on the other hand before starting of the motor. Since command values for the d'-axis and the q'-axis for control are yet to be determined, the positions for the d'-axis and the q'-axis are provisional. Hereinafter, the current command values that appear on the d'-axis and the q'-axis will be referred to as Id' and Iq', respectively, and the currents that actually flow in the d-axis and the q-axis as Id and Iq, respectively.

FIG. 6 shows the d'-axis and the q'-axis for control that coincide with the d-axis and the q-axis, respectively, based on the initial angular position estimated after the application of the voltage pulse to the stator coil.

Referring back to FIG. 2, the motor control unit 40 subtracts θa (in one example, 90°, i.e., π/2) from the calculated initial angular position and sets current command values Id' and Iq' based on the subtraction (S3 and S4). At the "initial energization after shifting the axes" between the processings P2 and P3 in FIG. 4, the angle formed by the rotor and the control axis or d'-axis is set to −θa. Then the current command values Id' and Iq' are set as in the following equations.

$$Iq'=Iqref\_m$$

$$Id'=Idref\_m$$

where, Iqref_m and Idref_m are initial current command values that are employed at the time of transition to the sensorless control. The initial values are determined preliminarily. The initial current command value may be a value that is large enough for the sensorless control to be executed after a predetermined rotational speed is reached or the current command values corresponding to the maximum output torque.

Subsequently, θa for the initial current command value is determined by the following equation.

$$\theta a=\arctan(-Idref\_m/Iqref\_m)+\pi/2$$

In the above equation, it is preferable that θa should be between 90° and 135°. If Idref_m=0, then θa=90° (=π/2).

Figure 7:
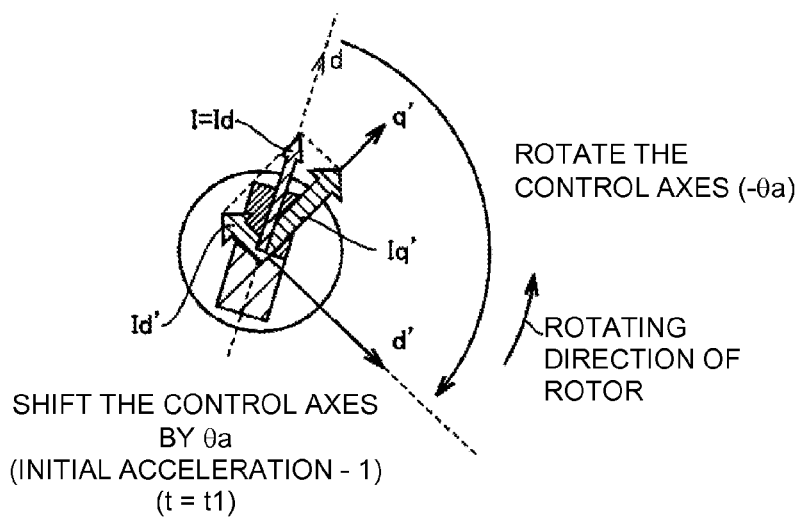

FIG. 7 shows an initial state of acceleration subsequent to the motor being energized after the control axes are shifted or rotated by −θa. As shown in FIG. 7, the d'-axis and the q'-axis for control are set to the positions that are shifted back by θa in the direction opposite to the rotation of the rotor from the positions of the d-axis and the q-axis determined by the position of the electromagnetic pole of the rotor. The currents Iq and Id when current is flowed through the d'-axis and the q'-axis for control are expressed by the following equations that are also shown in FIG. 4.

$$Iq=0$$

$$Id=\sqrt{Iqref\_m^2+Idref\_m^2}$$

If θa=90°, then Id=Iqref_m. More specifically, although the motor control unit 40 causes a current to flow through the q-axis, the current actually flows through the d-axis by shifting the control axis by 90° and no current flows through the q-axis, so that no large torque is generated in the rotor. Rotating the phase of motor current in this state rotates the rotor and then accelerates the rotation speed of the rotor.

Referring back to FIG. 2, once the current command values are set, the motor control unit 40 starts to energize the switching circuit 30 and increases the output frequency at a predetermined rate (S5 in FIG. 2, P3 in FIG. 3). This processing of increasing is executed by the acceleration controller 54 in FIG. 1. The processing of shifting or rotating the control axis by −θa in FIG. 7 corresponds to provision of an offset value of −θa to θ that is output by the acceleration controller 54, that is, to the rotating processing of the present invention.

Figure 8:
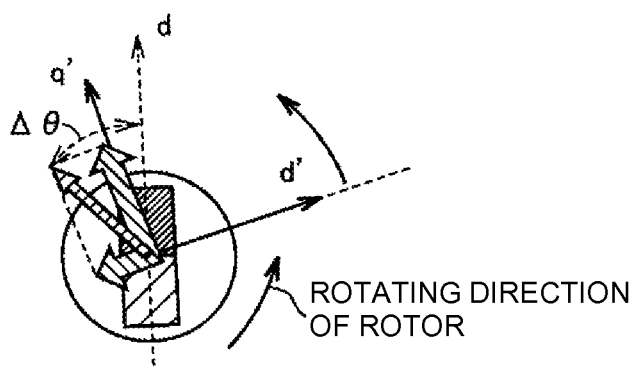
FIG. 8 is a view showing a state in which the phase of the current is rotated.

FIG. 8 shows a state in which phase of the current is rotated. As shown in FIG. 8, the d'-axis and the q'-axis for control are rotated in the rotating direction of the rotor, the phase of Δθ of the motor current (the current of the q'-axis) is advanced with respect to the d-axis for the delay of the rotation of the rotor. Then a current component of the q-axis that corresponds to the torque component is generated and the rotor is rotated accordingly. The actual currents Iq and Id that are determined in the processing P3 are expressed as follows and also shown in FIG. 4.

$$Iq=\sqrt{Iqref\_m^2+Idref\_m^2}\sin\Delta\theta$$

$$Id=\sqrt{Iqref\_m^2+Idref\_m^2}\cos\Delta\theta$$

When a predetermined rotational speed of the rotor is reached after the start of the energization and the acceleration, the control transits to the sensorless control while maintaining the current control (S6 in FIG. 2, P4 in FIG. 3). At this time, the angle formed by the rotor and the control axis or d'-axis is converged to almost zero. Therefore, the actual currents Iq and Id thus become substantially the same as the commanded currents Iq' and Id', respectively.

Figure 9:
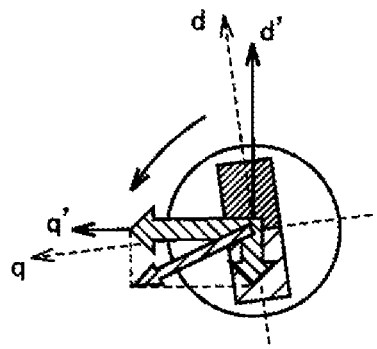
FIG. 9 is a view showing a state of the d'-axis, the q'-axis, the d-axis, and the q-axis after a transition of control to the sensorless control.

FIG. 9 shows the d'-, q'-, d-, and q-axes after the transition to the sensorless control. After the transition to the sensorless control is completed, the position/speed estimator 42 (FIG. 1) estimates the angular position and the speed of the rotor based on the actual currents Id and Iq and executes feedback control so that the estimated speeds coincide with the commanded speeds. The then commanded current values Iq' and Id' correspond to Idref and Idref, respectively, that are determined by the feedback control (the processing P4 in FIG. 4).

The motor control unit 40 of the present embodiment enters the sensorless control smoothly without switching the axes.

In the technique disclosed in paragraph 0055 of Japanese Unexamined Patent Application Publication No. 2004-72906, the processing of current switching phase (corresponding to the switching of the current axes) is executed after the processing of forcibly rotating the rotor. Specifically, the current command value Idr is switched from a predetermined value Ids to zero and the current command value Idr is switched from zero to a predetermined value Iqs according to the equations shown below.

$$Idr=Ids\cdot\cos(\omega s\cdot t)$$

$$Iqr=Iqs\cdot\sin(\omega s\cdot t)$$

where, ωs represents an angular velocity command value immediately before the transition to the current switching phase, and t represents the period of time elapsed after the start of the current switching phase. The commanded current values Ids and Iqs correspond to the commanded current values Iq' and Id' of the present embodiment, respectively.

In contrast to the processing of the above-identified Publication, in the present embodiment, the axes are switched when the processing is shifted from the processing P2 to the processing P3, as shown in FIG. 4. In the processing P3 of the present embodiment, the actual positions of the d-axis and the q-axis are obtained by estimation based on the applied voltage pulse. The positions of the Id'-axis and the Iq'-axis, i.e., the positions of the d-axis and the q-axis that are shifted or rotated by −θa are recognized (translated) as the angular position of the rotor for control and a start control is executed. With this, the control is switched to the sensorless control with the current command values Iq'=Iqreq_m and Id'=Idreq_m unchanged. The target current initial values of the sensorless control are Iq'=Iqreq_m and Id'=Idreq_m. Therefore, no significant change occurs in the current command values immediately after switching to the sensorless control and the rotor is rotated stably.

In the present embodiment in which the axes are switched at a phase prior to rotating the rotor, a complicated processing for switching the axes according to the above equations for the current command values Idr and Iqr while the rotor is rotating is unnecessary, so that the robustness of the control is improved.

In this embodiment, instead of the determination of the rotor angular position processing as executed in the above Publication, the detection of the initial angular position of the rotor is performed to execute a control for the detected position. According to the present embodiment, therefore, energy consumption is smaller as compared with the case of the Publication. In the above Publication, it is hard to determine the angular position of the rotor depending on the initial angular position of the rotor. In the present embodiment, however, no such problem occurs and the rotor is not rotated at the phase of initial angular position determination, resulting in a fast and quiet processing.

The mode of the present embodiment will now be summarized again with reference to FIG. 1 and other figures. The motor drive device (the inverter device 10) of the present embodiment drives the multi-phase synchronous motor 5 including the rotor having the permanent magnet and the stator in which the coils of different phases 6 to 8 are wound. The motor drive device includes the inverter (the switching circuit 30) that supplies current to the coils of different phases and the control apparatus (the motor control unit 40) that controls the inverter. The control apparatus executes the initial angular position calculation processing of detecting the d-axis and the q-axis as the initial angular position of the rotor based on the current flowing in response to the voltage pulse that is applied to the coils of different phases of the stator (steps S1 and S2 in FIG. 2); the rotating processing of rotating the d-axis and the q-axis by $-\theta a$ in a direction opposite to rotating direction of the rotor; the accelerating processing of accelerating the rotor by rotating the rotated d-axis and the rotated q-axis in the rotating direction of the rotor and flowing the torque component current determined based on a d-axis and a q-axis t (step S5 in FIG. 2); and the sensorless control processing of controlling the rotation of the rotor by estimating the angular position and the speed of the rotor based on the voltage applied to or the current flowing through the coils of different phases after the angular velocity of the rotor has reached a predetermined speed by executing the acceleration processing and controlling the rotation of the rotor based on the estimated angular position and the speed of the rotor (step S6 in FIG. 2).

The electric compressor may include the motor drive device of the present embodiment and a multi-phase synchronous motor that is driven by the motor drive device.

The embodiment disclosed herein is illustrative and therefore should not be construed as restrictive in any and all aspects. The scope of the present invention is defined by the appended claims, not by the embodiment described above, and various modifications may be made within the scope of the claims and the context and the scope of the doctrine of the equivalents.

What is claimed is:

1. A motor drive device that drives a multi-phase synchronous motor in an electric compressor, the multi-phase synchronous motor including a rotor having a permanent magnet and a stator having coils of different phases, the motor drive device comprising:
   an inverter that supplies current to the coils; and
   a control unit that controls the inverter, wherein
   the control unit executes:
   an initial angular position calculation processing including detecting a d-axis and a q-axis of the rotor as an initial angular position of the rotor based on a current flowing in response to a voltage pulse applied to the coils of the stator;
   a rotating processing including rotating the d-axis and the q-axis of the rotor by a predetermined angle $\theta a$ in a direction opposite to rotation of the rotor;
   an acceleration processing including accelerating the rotation of the rotor by rotating the rotated d-axis and the rotated q-axis in the rotating direction of the rotor and flowing through the stator the torque component current determined based on a d-axis and a q-axis; and
   a sensorless control processing including controlling the rotation of the rotor based on an angular position and a speed of the rotor estimated based on the voltage applied to or the current flowing through the coils after an angular velocity of the rotor has reached a predetermined speed by executing the acceleration processing, wherein
   the predetermined angle $\theta a$ is determined based on an initial target of a d-axis and an initial target of a q-axis of the sensorless control processing.

2. The motor drive device according to claim 1, wherein the predetermined angle $\theta a$ is determined by equation $\theta a = \arctan(-\text{Idref\_m}/\text{Iqref\_m}) + \pi/2$, where Idref_m and Iqref_m are the initial target of a d-axis and the initial target of a q-axis of the sensorless control processing.

3. The motor drive device according to claim 1, wherein $\theta a$ is in a range between $\pi/2$ and $3\pi/4$.

4. An electric compressor comprising:
   a multi-phase synchronous motor including a rotor having a permanent magnet and a stator having coils of different phases; and
   a motor drive device that drives the multi-phase synchronous motor, the motor drive device including an inverter that supplies current to the coils and a control unit that controls the inverter, wherein
   the control unit executes:
   an initial angular position calculation processing including detecting a d-axis and a q-axis of the rotor as an initial angular position of the rotor based on a current flowing in response to a voltage pulse applied to the coils of the stator;
   a rotating processing including rotating the d-axis and the q-axis of the rotor by a predetermined angle $\theta a$ in a direction opposite to rotation of the rotor;
   an acceleration processing including accelerating the rotation of the rotor by rotating the rotated d-axis and the rotated q-axis in the rotating direction of the rotor and flowing through the stator the torque component current determined based on a d-axis and a q-axis; and
   a sensorless control processing including controlling the rotation of the rotor based on an angular position and a speed of the rotor estimated based on the voltage applied to or the current flowing through the coils after an angular velocity of the rotor has reached a predetermined speed by executing the acceleration processing, wherein
   the predetermined angle $\theta a$ is determined based on an initial target of a d-axis and an initial target of a q-axis of the sensorless control processing.

* * * * *